United States Patent
Tomita et al.

(10) Patent No.: US 8,655,367 B2
(45) Date of Patent: Feb. 18, 2014

(54) COMMUNICATION METHOD, MANAGEMENT DEVICE, AND MOBILE DEVICE

(75) Inventors: Tetsuo Tomita, Kawasaki (JP); Bun Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/293,799

(22) Filed: Nov. 10, 2011

(65) Prior Publication Data

US 2012/0058769 A1  Mar. 8, 2012

Related U.S. Application Data

(63) Continuation of application No. PCT/JP2009/061229, filed on Jun. 19, 2009.

(51) Int. Cl.
*H04W 36/00* (2009.01)

(52) U.S. Cl.
USPC ........... 455/436; 455/437; 370/331; 370/332; 370/333

(58) Field of Classification Search
USPC ............................ 455/436, 437; 370/331–333
See application file for complete search history.

(56) References Cited

U.S. PATENT DOCUMENTS

| | | | |
|---|---|---|---|
| 7,885,654 B2 * | 2/2011 | Fadell | 455/435.2 |
| 2009/0047958 A1 * | 2/2009 | Rimhagen et al. | 455/436 |
| 2010/0017861 A1 * | 1/2010 | Krishnaswamy et al. | 726/7 |

FOREIGN PATENT DOCUMENTS

| | | |
|---|---|---|
| EP | 1 691 260 | 8/2006 |
| EP | 1718093 | 11/2006 |
| JP | 2006-228209 | 8/2006 |
| JP | 2006-311558 | 11/2006 |
| JP | 2007-235495 | 9/2007 |
| JP | 2007-318361 | 12/2007 |
| WO | 2008/113385 | 9/2008 |

OTHER PUBLICATIONS

International Search Report issued for corresponding International Patent Application No. PCT/JP2009/061229, dated Jul. 21, 2009. English translation attached.

Notice of Rejection issued for corresponding Japanese Patent Application No. 2011-519390, mailed Sep. 18, 2012, with English translation.

* cited by examiner

*Primary Examiner* — Patrick Edouard
*Assistant Examiner* — Julio Perez
(74) *Attorney, Agent, or Firm* — Myers Wolin, LLC

(57) ABSTRACT

In a communication system 10, a management device 100, which is under the control of the MVNO, collects radio quality information from a UE 500 by using a communication channel established between the management device 100 and the UE 500, selects an optimum cell by using the collected radio quality information, and notifies the UE 500 of the selected optimum cell. The UE 500 then connects or hands over to the optimum cell notified by the management device 100.

5 Claims, 11 Drawing Sheets

FIG.3

|  | CURRENT CELL | ADJACENT/ OVERLAPPING CELL | ADJACENT/ OVERLAPPING CELL | ... |
|---|---|---|---|---|
| RADIO FIELD INTENSITY | ... | ... | ... | ... |
| RADIO ERROR RATE | ... | ... | ... | ... |
| RADIO RATE | ... | | | ... |
| RETRANSMISSION RATE | ... | | | ... |
| REGULATION INFORMATION | ... | ... | ... | ... |
| PRIORITY INFORMATION | ... | ... | ... | ... |
| CELL ID | ... | | | ... |
| CURRENT POSITION | ... | | | ... |
| MNO-ID | ... | | | ... |
| ADJACENT/OVER- LAPPING CELL ID | | ... | ... | ... |
| CONNECTION RATE | ... | | | ... |

FIG.4

| MNO-ID | CELL ID | CONNECTION QUALITY | EFFECTIVE RATE | USAGE STATE | OCCUPANCY STATE | OVERALL RANKING | ADJACENT/ OVER- LAPPING CELL |
|---|---|---|---|---|---|---|---|
| AAA | A | RANK A | 1 Mbps | MEDIUM PRIORITY | DENSE | 3 | B, C, D |
| AAA | B | RANK A | 4 Mbps | MEDIUM PRIORITY | SPARSE | 2 | A, C, E |
| AAA | C | RANK E | 384 kbps | LOW PRIORITY | OVER- CROWDED | 5 | A, B, F |
| BBB | D | RANK S | 10 Mbps | HIGH PRIORITY | SPARSE | 1 | A |
| BBB | E | RANK B | 5 Mbps | LOW PRIORITY | DENSE | 4 | B, F |
| CCC | F | RANK D | 1 Mbps | NON- USABLE | SPARSE | 6 | D, E |
| ... | ... | ... | ... | ... | ... | ... | ... |

FIG.5

| CELL | RECOMMENDED LEVEL | MNO-ID | CELL ID |
|---|---|---|---|
| A | No. 1 | BBB | D |
| A | No. 2 | AAA | B |
| A | No. 3 | AAA | C |
| B | No. 1 | AAA | A |
| B | No. 2 | BBB | E |
| B | No. 3 | AAA | C |
| ... | ... | ... | ... |

FIG.6

CELL MANAGEMENT TABLE

| MNO-ID | CELL ID | CONNECTION QUALITY | EFFECTIVE RATE | USAGE STATE | OCCUPANCY STATE | OVERALL RANKING | ADJACENT/OVER-LAPPING CELL |
|---|---|---|---|---|---|---|---|
| AAA | A | RANK A | 1 Mbps | MEDIUM PRIORITY | DENSE | 3 | B, C, D |
| AAA | B | RANK A | 4 Mbps | MEDIUM PRIORITY | SPARSE | 2 | A, C, E |
| AAA | C | RANK E | 384 kbps | LOW PRIORITY | OVER-CROWDED | 5 | A, B, F |
| BBB | D | RANK S | 10 Mbps | HIGH PRIORITY | SPARSE | 1 | A |
| BBB | E | RANK B | 5 Mbps | LOW PRIORITY | DENSE | 4 | B, F |
| CCC | F | RANK D | 1 Mbps | NON-USABLE | SPARSE | 6 | D, E |
| ... | ... | ... | ... | ... | ... | ... | ... |

EXTRACT

ADJACENT/OVERLAPPING CELL INFORMATION

| MNO-ID | CELL ID | CONNECTION QUALITY | EFFECTIVE RATE | USAGE STATE | OCCUPANCY STATE | OVERALL RANKING | ADJACENT/OVER-LAPPING CELL |
|---|---|---|---|---|---|---|---|
| AAA | B | RANK A | 4 Mbps | MEDIUM PRIORITY | SPARSE | 2 | A, C, E |
| AAA | C | RANK E | 384 kbps | LOW PRIORITY | OVER-CROWDED | 5 | A, B, F |
| BBB | D | RANK S | 10 Mbps | HIGH PRIORITY | SPARSE | 1 | A |

FIG.7

ADJACENT/OVERLAPPING CELL INFORMATION

| MNO-ID | CELL ID | CONNECTION QUALITY | EFFECTIVE RATE | USAGE STATE | OCCUPANCY STATE | OVERALL RANKING | ADJACENT/ OVER- LAPPING CELL |
|---|---|---|---|---|---|---|---|
| AAA | B | RANK A | 4 Mbps | MEDIUM PRIORITY | SPARSE | 2 | A, C, E |
| AAA | C | RANK E | 384 kbps | LOW PRIORITY | OVER- CROWDED | 5 | A, B, F |
| BBB | D | RANK S | 10 Mbps | HIGH PRIORITY | SPARSE | 1 | A |

EXTRACT

ADJACENT/OVERLAPPING CELL SORT INFORMATION

SORTING IN ASCENDING ORDER OF OVERALL RANKING

| MNO-ID | CELL ID | CONNECTION QUALITY | EFFECTIVE RATE | USAGE STATE | OCCUPANCY STATE | OVERALL RANKING | ADJACENT/ OVER- LAPPING CELL |
|---|---|---|---|---|---|---|---|
| BBB | D | RANK S | 10 Mbps | HIGH PRIORITY | SPARSE | 1 | A |
| AAA | B | RANK A | 4 Mbps | MEDIUM PRIORITY | SPARSE | 2 | A, C, E |
| AAA | C | RANK E | 384 kbps | LOW PRIORITY | OVER- CROWDED | 5 | A, B, F |

RADIO QUALITY INFORMATION

| MNO-ID | CELL ID | QUALITY | SELECTION | |
|---|---|---|---|---|
| #1 | CELL 1 | POOR RADIO QUALITY, REGULATED | × | |
| | CELL 2 | POOR RADIO QUALITY, CROWDED | △ | |
| | ... | | | |
| | CELL 5 | SYSTEM IS DOWN | × | |
| | ... | | | |
| #2 | CELL 1 | HIGH RADIO QUALITY, AVAILABLE | ○ | (2) |
| | ... | ... | | |

COMMUNICATION METHOD, MANAGEMENT DEVICE, AND MOBILE DEVICE

CROSS-REFERENCE TO RELATED APPLICATION

This application is a continuation of International Application No. PCT/JP2009/061229, filed on Jun. 19, 2009, the entire contents of which are incorporated herein by reference.

FIELD

The embodiment discussed herein is directed to a communication method, a management device, and a mobile device.

BACKGROUND

In the field of mobile communications, the provision of services is underway by Mobile Virtual Network Operators (MVNOs) that use existing communication facilities, such as base stations, which are under the control of Mobile Network Operators (MNOs) (see Japanese Laid-open Patent Publication No. 2007-318361). An MVNO contracts with a single MNO so as to communicate with a mobile device by using a cell formed by a base station that is under the control of the MNO and so as to provide unique services, such as content delivery, for mobile devices. To provide such services, the MVNO selects a cell with a desired radio quality (hereafter, referred to as an "optimum cell") from a plurality of cells that are under the control of the MNO, with which the MVNO has made a contract, and performs communication with a mobile device via a base station that forms the optimum cell.

Because the customer needs are diversified and the number of MNOs has increased in recent years, it is assumed that in the future an MVNO will make contracts with a plurality of MNOs so as to provide services by using communication facilities that are under the control of the MNOs in combination.

In order for the MVNO to provide services by using the communication facilities that are under the control of a plurality of MNOs in combination, it is assumed that an optimum cell is selected from the cells that are formed by the respective base stations owned by the MNOs and communication is performed between the MVNO and a mobile device via the base station that forms the optimum cell.

A possible method for performing such communication is, for example, that the mobile device selects an optimum cell so as to perform communication with the MVNO via the base station of the MNO that forms the selected optimum cell, as illustrated in FIG. 10 (hereafter, referred to as a "mobile-device-driven method").

As illustrated in FIG. 11, another possible method is that the MVNO selects an optimum cell and notifies the mobile device of the selected optimum cell so as to perform communication with the mobile device (hereafter, referred to as an "MVNO-driven method"). A detailed explanation is given here of the MVNO-driven method. First, the MVNO collects, from each MNO, radio quality information that indicates the radio quality, such as the presence or absence of access restrictions or the level of crossed lines, of each cell formed by a base station owned by each MNO (see FIG. 11 (1)). The MVNO selects an optimum cell by using the radio quality information (see FIG. 11 (2)) and then notifies each of the MNOs of the optimum cell information that indicates the selected optimum cell (see FIG. 11 (3)). After being notified by the MVNO, each MNO notifies a mobile device of the optimum cell information (see FIG. 11 (4)). Afterwards, the mobile device performs communication with the MVNO via the base station of the MNO that forms the optimum cell indicated by the optimum cell information (see FIG. 11 (5)).

Here, a comparison is made between the mobile-device-driven method and the MVNO-driven method. FIG. 12 is a diagram that illustrates the mobile-device-driven method, and FIG. 13 is a diagram that illustrates the MVNO-driven method. As illustrated in FIG. 12, in the mobile-device-driven method, a user of the mobile device needs to select the optimum cell and the MNO that controls the optimum cell, which causes the problem of a heavy burden being imposed on users. On the other hand, as illustrated in FIG. 13, in the MVNO-driven method, the user of the mobile device does not need to select the optimum cell and the MNO that controls the optimum cell; therefore, a low burden is imposed on users. Thus, it is considered that the MVNO-driven method has an advantage over the mobile-device-driven method when the MVNO provides services by using the communication facilities that are under the control of a plurality of MNOs in combination.

In the above-described MVNO-driven method, as a condition for the MVNO to select an optimum cell and the MNO that controls the optimum cell, the MVNO collects, from the MNO, radio quality information that indicates the radio quality, such as the presence or absence of access restrictions or the level of crossed lines, of each cell. Such radio quality information is closely related to confidential information, such as information on the location of base stations, which is not disclosed to other companies because of the contract that is based on the contract conditions between the MNOs. Therefore, there is a low possibility that the MVNO can actually collect substantial radio quality information from the MNO. Hence, the MVNO may incorrectly select an optimum cell and the MNO that controls the optimum cell. In such a case, the mobile device may not be able to use the base station that forms the optimum cell. As a result, the communication state between the mobile device and the MVNO deteriorates, which causes a problem in that the MVNO may not be able to provide satisfactory services.

SUMMARY

According to an aspect of an embodiment of the invention, a communication method is performed by a communication system that includes a management device and a mobile device that can perform communication with the management device via a predetermined communication channel. The communication method includes collecting, performed by the mobile device, radio quality information that indicates radio qualities of a cell that is currently being used for communication by the mobile device and of adjacent or overlapping cells of the cell; first transmitting, performed by the mobile device, the collected radio quality information to the management device by using the communication channel; receiving, performed by the management device, the radio quality information from the mobile device by using the communication channel; selecting, performed by the management device, an optimum cell with a desired radio quality from the adjacent or overlapping cells by using the received radio quality information; second transmitting, performed by the management device, optimum cell information that indicates the selected optimum cell to the mobile device by using the communication channel; and connecting or handing over, performed by the mobile device, to the optimum cell indicated by the transmitted optimum cell information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a table that illustrates an example of radio quality information stored in a radio-quality information storage unit;

FIG. 4 is a table that illustrates an example of a cell management table stored in a cell-management table storage unit;

FIG. 5 is a table that illustrates an example of optimum cell information stored in an optimum-cell information storage unit;

FIG. 6 is a table that explains a process performed by an adjacent/overlapping cell information extracting unit;

FIG. 7 is a table that explains a process performed by an adjacent/overlapping cell information sorting unit;

DESCRIPTION OF EMBODIMENT

Preferred embodiment of the present invention will be explained with reference to accompanying drawings.

Configuration of Communication System

Figure 1:
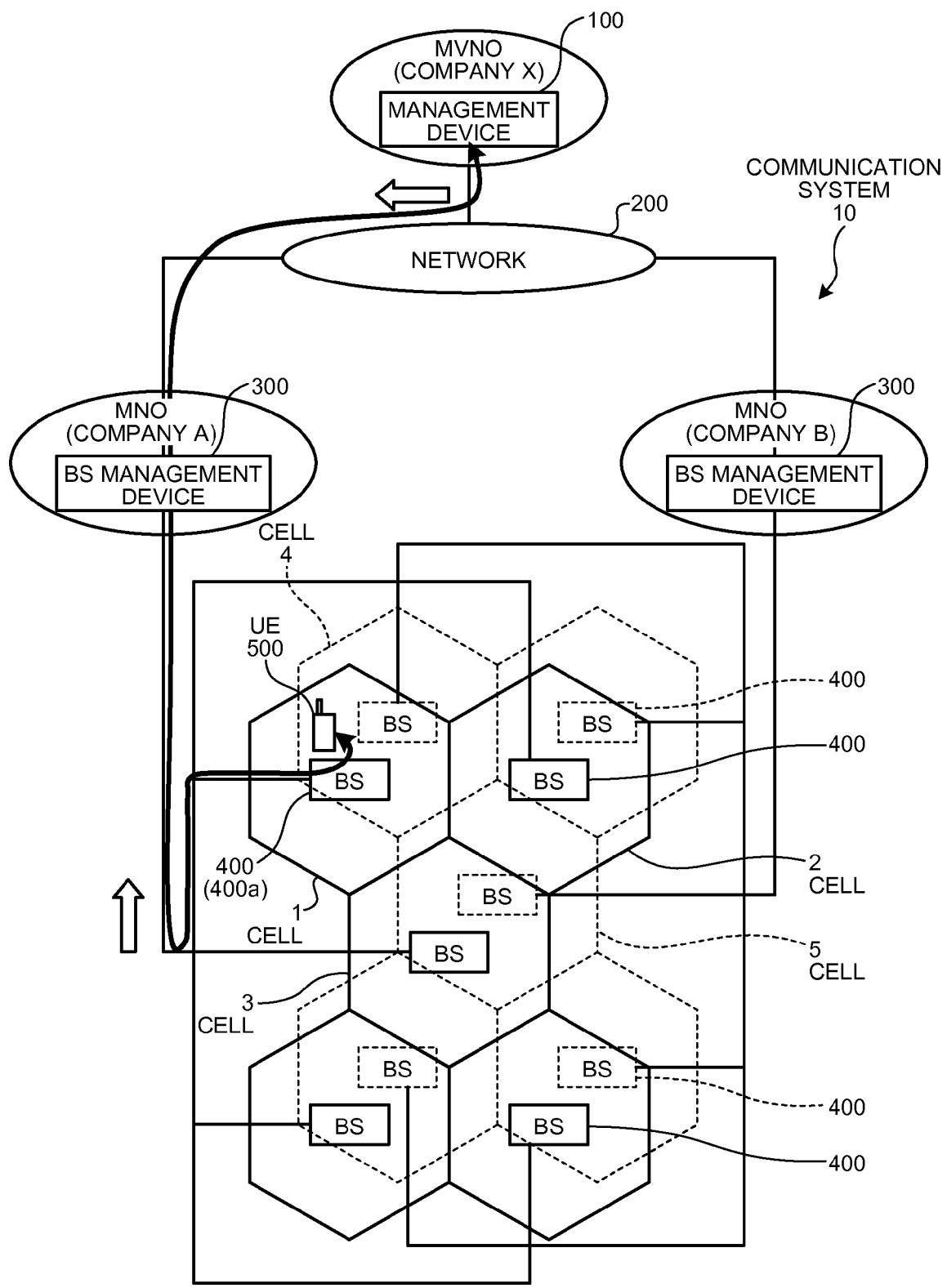
FIG. 1 is a block diagram that illustrates the configuration of a communication system that performs a communication method according to the present embodiment.

An explanation is given of the configuration of a communication system that performs a communication method according to the present embodiment. FIG. 1 is a block diagram that illustrates the configuration of the communication system that performs the communication method according to the present embodiment.

As illustrated in FIG. 1, a communication system 10 according to the present embodiment includes a management device 100, a network 200, Base Station (BS) management devices 300, BSs 400, and User Equipment (UE) (mobile device) 500.

The management device 100 is under the control of an MVNO (company X). The management device 100 performs communication with the UE 500 by using the BS management devices 300 and the BSs 400 that are under the control of a plurality of MNOs (company A and company B in the example illustrated in FIG. 1).

The network 200 is a large-capacity wide-area network. The network 200 connects the management device 100 to the BS management devices 300 that are under the control of the MNOs, i.e., company A and company B.

Each of the BS management devices 300 is a communication control device that manages the BSs 400 and performs various controls for performing wireless communication. The BS 400 is a communication device that includes (forms) a cell that is a wireless communication zone with a predetermined area and establishes a communication channel between the BS 400 and the UE 500 that is located within the cell included in the BS 400.

The UE 500 is a wireless communication device, such as a mobile phone. The UE 500 performs communication with the management device 100 that is under the control of the MVNO (company X) to which the user of the UE 500 has subscribed. In the example illustrated in FIG. 1, the UE 500 uses a cell 1, which is formed by a BS 400a, to perform communication with the management device 100 via a communication channel that is established between the UE 500 and the management device 100 via the BS 400a.

With the above-described configuration, in the communication system 10, the UE 500 collects radio quality information that indicates the radio quality of a cell (hereafter, referred to as a "current cell") that is currently being used for communication by the UE 500 and the radio quality of a cell (hereinafter, referred to as an "adjacent/overlapping cell") that is adjacent to or overlapping with the current cell. In the example illustrated in FIG. 1, the UE 500 collects radio quality information on the cell 1, which is the current cell, and cells 2 to 5, which are adjacent/overlapping cells.

The UE 500 then transmits to the management device 100 the collected radio quality information by using the communication channel. In the example illustrated in FIG. 1, the UE 500 transmits radio quality information to the management device 100 by using the communication channel that is established between the UE 500 and the management device 100 via the BS 400a that forms the cell 1, which is the current cell.

The management device 100 receives the radio quality information from the UE 500 by using the communication channel. By using the received radio quality information, the management device 100 then selects an optimum cell, which is a cell with a desired radio quality, from the adjacent/overlapping cells. Specifically, the management device 100 manages information about the state of each cell that can be calculated by using the radio quality information and, by using the information, ranks the adjacent/overlapping cells so as to create optimum cell information that indicates the optimum cell.

The management device 100 then transmits the optimum cell information to the UE 500 by using the communication channel. In the example illustrated in FIG. 1, the management device 100 transmits the optimum cell information to the UE 500 by using the communication channel that is established between the management device 100 and the UE 500 via the BS 400a that forms the cell 1, which is the current cell.

The UE 500 then receives the optimum cell information from the management device 100 by using the communication channel. The UE 500 connects or hands over to the optimum cell indicated by the optimum cell information as needed.

Thus, in the communication system 10 according to the present embodiment, the management device 100, which is under the control of the MVNO (company X), collects radio quality information from the UE 500 by using the communication channel that is established between the management device 100 and the UE 500 that has made a contract with the MVNO (company X). The management device 100 then selects an optimum cell in accordance with the collected radio quality information and notifies the UE 500 of the selected optimum cell. The UE 500 then connects or hands over to the optimum cell notified by the management device 100. Thus, the MVNO can collect, from the UE, the radio quality information that is kept private by the MNO, and it is possible to prevent the MVNO from making a mistake in the selection of the optimum cell. As a result, if the MVNO provides services by using the communication facilities that are under the control of a plurality of MNOs in combination, the MVNO can correctly select the optimum cell for communication with a mobile device.

Configuration of Management Device

Figure 2:
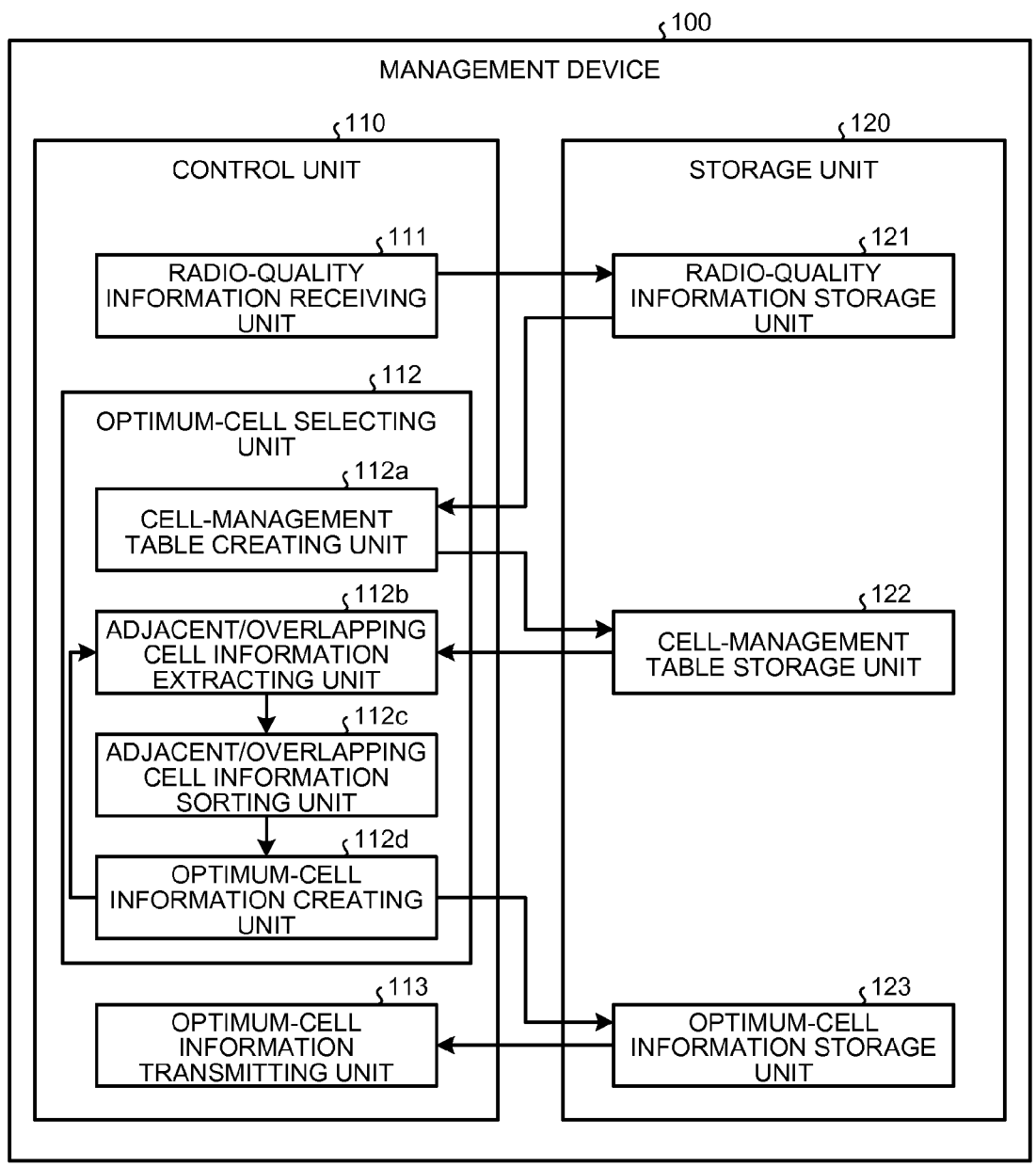
FIG. 2 is a block diagram that illustrates the configuration of a management device included in the communication system according to the present embodiment.

Next, an explanation is given of the detailed configuration of the management device 100 with reference to FIG. 2. FIG. 2 is a block diagram that illustrates the configuration of the management device 100 included in the communication system 10 according to the present embodiment. As illustrated in FIG. 2, the management device 100 includes a control unit 110 and a storage unit 120.

The storage unit 120 stores therein data and programs that are used for various processes performed by the control unit 110. The storage unit 120 includes a radio-quality information storage unit 121, a cell-management table storage unit 122, and an optimum-cell information storage unit 123.

The radio-quality information storage unit 121 stores therein radio quality information that indicates the radio qualities of the current cell and the adjacent/overlapping cells of the UE 500 that is under contract to the MVNO (company X in the example illustrated in FIG. 1). FIG. 3 illustrates an example of radio quality information. As illustrated in FIG. 3, the radio-quality information storage unit 121 stores, as radio quality information, "radio field intensity", "radio error rate", "radio rate", "retransmission rate", "regulation information", "priority information", "cell ID", "current position", "MNO-ID", "adjacent/overlapping cell ID", and "connection rate".

The "radio field intensity" is information about the radio field intensities of the current cell and the adjacent/overlapping cells. The "radio error rate" is information on the radio error rate for data transmission and reception in the current cell and the adjacent/overlapping cells. The "radio rate" is information on the average radio rate of data transmission and reception in the current cell. The "retransmission rate" is information on the average retransmission rate for data transmission and reception in the current cell. The "regulation information" indicates the presence or absence of use regulation for the current cell and the adjacent/overlapping cells. The "priority information" is information that indicates a use priority of the current cell and the adjacent/overlapping cells. The "cell ID" is an identifier for identifying the current cell. The "current position" is information on the position of the UE 500 in the current cell. The "MNO-ID" is an identifier for identifying the MNO that controls the current cell. The "adjacent/overlapping cell ID" is the cell ID of an adjacent/overlapping cell. The "connection rate" is the success rate of communication performed between the UE 500 and the management device 100 in the current cell.

The radio quality information is received by a radio-quality information receiving unit 111, which will be described later, from the UE 500 and stored in the radio-quality information storage unit 121.

The cell-management table storage unit 122 stores therein a cell management table where information about the state of a cell, which can be calculated by using radio quality information, is related to each cell. FIG. 4 illustrates an example of the cell management table. As illustrated in FIG. 4, the cell-management table storage unit 122 stores therein a cell management table where the MNO-ID, cell ID, connection quality, effective rate, usage state, occupancy state, overall ranking, and adjacent/overlapping cell are related to one another.

The "MNO-ID" is an identifier for identifying an MNO that controls a cell. The "cell ID" is an identifier for identifying a cell that is under the control of the MNO indicated by the MNO-ID. The "connection quality" is information that indicates the degree of difficulty of connecting to the cell indicated by the cell ID. The "effective rate" is information that indicates the actual radio rate within the cell indicated by the cell ID. The "usage state" is information that indicates the usage state of the cell indicated by the cell ID. The "occupancy state" is information that indicates the number of UEs located within the cell indicated by the cell ID. The "overall ranking" is information that indicates the ranking that is obtained by comprehensively evaluating the state of the cell indicated by the cell ID. The "adjacent/overlapping cell" is information that indicates the cell IDs of the adjacent/overlapping cells corresponding to the cell indicated by the cell ID. The cell management table is created by a cell-management table creating unit 112a that will be described later.

The optimum-cell information storage unit 123 stores, as optimum cell information, information that indicates an optimum cell that is a cell with a desired radio quality among the adjacent/overlapping cells of the current cell. The optimum cell indicated by the optimum cell information is, for example, a candidate cell to which the current cell is handed over by the UE when the state of the current cell deteriorates for some reason.

FIG. 5 illustrates an example of the optimum cell information. As illustrated in FIG. 5, the optimum-cell information storage unit 123 stores therein, as the optimum cell information, cell, recommended level, MNO-ID, and cell ID. The "cell" is information that indicates the cell ID of the current cell. The "recommended level" is information that indicates the recommended level of the adjacent/overlapping cell corresponding to the current cell. The "recommended level" indicates that, as the recommended level is higher, the radio quality of the cell is better. The "MNO-ID" is an identifier for identifying the MNO that controls an adjacent/overlapping cell. The "cell ID" is an identifier for identifying an adjacent/overlapping cell corresponding to the current cell. The optimum cell information is created by an optimum-cell information creating unit 112d, which will be described later.

The control unit 110 includes an internal memory that stores programs that define various procedures, or the like, and data, by which the control unit 110 performs various processes. The control unit 110 includes the radio-quality information receiving unit 111, an optimum-cell selecting unit 112, and an optimum-cell information transmitting unit 113.

The radio-quality information receiving unit 111 receives from the UE 500 radio quality information that indicates the radio qualities of the current cell and the adjacent/overlapping cells by using the communication channel. An explanation is given here of a detailed example. If the UE 500 has captured the BS 400a (see FIG. 1), the BS management device 300, which is under the control of the MNO (company A), receives a connection request from the UE 500 and then establishes a communication channel between the UE 500 and the management device 100 via the BS 400a. Then, the radio-quality information receiving unit 111 receives radio quality information from the UE 500 via the established communication channel and stores the received radio quality information in the radio-quality information storage unit 121.

The optimum-cell selecting unit 112 is a processing unit that selects an optimum cell with a desired radio quality from the adjacent/overlapping cells corresponding to the current cell by using the radio quality information received by the radio-quality information receiving unit 111. Specifically, the optimum-cell selecting unit 112, which is a processing unit that selects an optimum cell, includes the cell-management table creating unit 112a, an adjacent/overlapping cell information extracting unit 112b, an adjacent/overlapping cell information sorting unit 112c, and the optimum-cell information creating unit 112d.

The cell-management table creating unit 112a creates a cell management table (see FIG. 4) where the information about the state of a cell, which can be calculated by using radio quality information, is related to each cell. Specifically, the cell-management table creating unit 112a reads from the radio-quality information storage unit 121 the radio quality information received by the radio-quality information receiving unit 111. The cell-management table creating unit 112a then creates a cell management table by using the read radio quality information.

Specifically, the "MNO-ID" contained in the radio quality information is registered under the "MNO-ID" in the cell management table, and the "cell ID" of the current cell contained in the radio quality information is registered under the "cell ID" in the cell management table. Under the "connection quality" in the cell management table, information is registered that indicates the degree of difficulty of connecting to a cell. The degree of difficulty is obtained by ranking "radio field intensity", "radio error rate", and "connection rate", which are contained in the radio quality information, according to the range of each value (for example, "rank S" that indicates easy connection if the "radio field intensity" is high, the "radio error rate" is low, and the "connection rate" is high).

Under the "effective rate" in the cell management table, the actual radio rate of a cell is registered. The actual radio rate is calculated by using the "radio rate" and "retransmission rate" contained in the radio quality information. For example, if the "radio rate" is 100 Mbps and if the "retransmission rate" is 0.99, 100×(1−0.99)=1 Mbps is registered under the "effective rate" as the actual radio rate, as illustrated in the first column of FIG. 4.

Under the "usage state" in the cell management table, the usage state of a cell is registered. The usage state is calculated by using "regulation information" and "priority information" contained in the radio quality information. For example, if the "regulation information" indicates that there is a use regulation, the "usage state" is described as "non-usable", which indicates that the cell may not be able to be used. If the "regulation information" indicates that there is no use regulation, "priority information" is registered in the "usage state" without change.

Furthermore, under the "occupancy state" in the cell management table, information is registered that indicates the number of UEs present in a cell. For example, the radio-quality information receiving unit 111 counts the number of UEs that have transmitted radio quality information and adds the counted number of UEs (the count UE number) to the radio quality information. In accordance with the count UE number added to the radio quality information, the cell-management table creating unit 112a registers under the "occupancy state" any one of "sparse", "dense", and "overcrowded", which indicate the degree of density of communication in the cell.

Under the "overall ranking" in the cell management table, information is registered that indicates the ranking of each cell. The ranking is obtained by comprehensively evaluating the "connection quality", "effective rate", "usage state", and "occupancy state". For example, as illustrated in the fourth column of FIG. 4, the cell with the cell ID "D" that is under the control of the company B with the MNO-ID "BBB" is given the first place of the "overall ranking" because the "connection quality", "effective rate", "usage state", and "occupancy state" of the cell are all good.

Under the "adjacent/overlapping cell" in the cell management table, the cell ID of the adjacent/overlapping cell corresponding to the current cell is registered. For example, if the "MNO-ID" is identical, the "adjacent/overlapping cell ID" contained in the radio quality information is registered without change. Conversely, if "MNO-ID" is different, the cell IDs of the current cells in which the UE 500, whose distance to the other UE obtained from the "current position" contained in the radio quality information is smaller than a predetermined value, is present are registered.

The adjacent/overlapping cell information extracting unit 112b extracts, from the cell management table (see FIG. 4), the adjacent/overlapping cell information that is information about the state of the adjacent/overlapping cell corresponding to the current cell and delivers the extracted adjacent/overlapping cell information to the adjacent/overlapping cell information sorting unit 112c. Here, a detailed explanation is given of a process performed by the adjacent/overlapping cell information extracting unit 112b with reference to FIG. 6. FIG. 6 is a table that explains the process performed by the adjacent/overlapping cell information extracting unit 112b.

As illustrated in FIG. 6, the adjacent/overlapping cell information extracting unit 112b reads from the cell-management table storage unit 122 the cell management table created by the cell-management table creating unit 112a. Then, the adjacent/overlapping cell information extracting unit 112b identifies in the read cell management table the cell IDs (the cell IDs "B", "C", and "D" in the example illustrated in FIG. 6) of the adjacent/overlapping cells corresponding to the cell ID (for example, the cell ID "A") of the current cell. The adjacent/overlapping cell information extracting unit 112b then extracts from the cell management table the adjacent/overlapping cell information that is information corresponding to the cell IDs (the cell IDs "B", "C", and "D" in the example illustrated in FIG. 6) of the identified adjacent/overlapping cells. The adjacent/overlapping cell information extracting unit 112b then delivers the extracted adjacent/overlapping cell information to the adjacent/overlapping cell information sorting unit 112c. The adjacent/overlapping cell information extracting unit 112b delivers, to the adjacent/overlapping cell information sorting unit 112c, the cell ID (the cell ID "A" in the example described above) of the current cell together with the adjacent/overlapping cell information.

The adjacent/overlapping cell information sorting unit 112c creates adjacent/overlapping cell sort information in which the information about the state of each cell is sorted in the ascending order of the overall ranking by using the adjacent/overlapping cell information and delivers the created adjacent/overlapping cell sort information to the optimum-cell information creating unit 112d. Here, a detailed explanation is given of a process performed by the adjacent/overlapping cell information sorting unit 112c with reference to FIG. 7. FIG. 7 is a table that explains the process performed by the adjacent/overlapping cell information sorting unit 112c.

As illustrated in FIG. 7, the adjacent/overlapping cell information sorting unit 112c creates adjacent/overlapping cell sort information that is information obtained by sorting the pieces of information about the cell IDs (for example, the cell IDs "B", "C", and "D") of cells, which are contained in the adjacent/overlapping cell information, in the ascending order of the overall ranking (for example, in the order of the overall ranking "1", "2", and "5"). The adjacent/overlapping cell information sorting unit 112c then delivers the created adjacent/overlapping cell sort information to the optimum-cell information creating unit 112d. The adjacent/overlapping cell information sorting unit 112c delivers, to the optimum-cell information creating unit 112d, the cell ID (the cell ID "A" in the example described above) of the current cell received from the adjacent/overlapping cell information extracting unit 112b together with the adjacent/overlapping cell sort information.

By using the adjacent/overlapping cell sort information, the optimum-cell information creating unit 112d creates optimum cell information (see FIG. 5) that indicates the optimum cell with a desired radio quality among the adjacent/overlapping cells corresponding to the current cell. Specifically, the optimum-cell information creating unit 112d extracts the "MNO-IDs" and "cell IDs" from the adjacent/overlapping cell sort information (see FIG. 7) delivered by the adjacent/overlapping cell information sorting unit 112c. The optimum-cell information creating unit 112d then adds, as a "cell", the cell ID (the cell ID "A" in the example described above) of the current cell, which has been received from the adjacent/overlapping cell information sorting unit 112c, to the extracted "MNO-IDs" and "cell IDs". Furthermore, the optimum-cell information creating unit 112d sets, as the recommended levels, the numbers arranged in the ascending order to the extracted "MNO-IDs" and "cell IDs", starting from the first column, so as to create optimum cell information.

The optimum-cell information creating unit 112d stores the created optimum cell information in the optimum-cell information storage unit 123.

In the management device 100 according to the present embodiment, after the optimum-cell information creating unit 112d has finished creating the optimum cell information, the adjacent/overlapping cell information extracting unit 112b extracts new adjacent/overlapping cell information from the cell management table. Then, the adjacent/overlapping cell information sorting unit 112c creates adjacent/overlapping cell sort information by using the extracted new adjacent/overlapping cell information. Then, the optimum-cell information creating unit 112d creates optimum cell information by using the created new adjacent/overlapping cell sort information. At that time, the optimum-cell information creating unit 112d adds the created new optimum cell information to the already created optimum cell information. The management device 100 repeats a series of processes for all of the cells indicated by the cell IDs contained in the cell management table.

As described above, the optimum-cell selecting unit 112 creates a cell management table by using the radio quality information received by the radio-quality information receiving unit 111 and selects the optimum cell by using the created cell management table (creates optimum cell information).

The optimum-cell information transmitting unit 113 transmits the optimum cell information to the UE 500 by using the communication channel. Here, an explanation is given of a detailed example. If the UE 500 has captured the BS 400a (see FIG. 1), the BS management device 300, which is under the control of the MNO (company A), receives a connection request from the UE 500 and then establishes a communication channel between the UE 500 and the management device 100 via the BS 400a. Then, the optimum-cell information transmitting unit 113 reads the optimum cell information from the optimum-cell information storage unit 123 and transmits the optimum cell information to the UE 500 via the established communication channel.

The optimum-cell information transmitting unit 113 can use a Multimedia Broadcast and Multicast Service (MBMS) channel for transmitting and receiving MBMS data as a communication channel so as to transmit the optimum cell information to a plurality of UEs 500 simultaneously. Here, an explanation is given of a detailed example. If each of the UEs 500 has captured the BS 400, the BS management devices 300, which are under the control of the MNOs, i.e., the company A and the company B, receive a request for setting an MBMS channel from the management device 100 and then establish an MBMS channel between the UE 500 and the management device 100 via the BS 400. Then, the optimum-cell information transmitting unit 113 simultaneously transmits the optimum cell information to the plurality of UEs 500 via the established MBMS channels.

As described above, the optimum cell information is transmitted by using the MBMS channel so that the optimum cell information can be delivered to the UE 500 that is not connected to the management device 100. Furthermore, the MBMS channel is usually established only between the management device 100 and the UE 500 that is authenticated by the management device 100 that is under the control of the MVNO, the company X. Therefore, the optimum-cell information transmitting unit 113 can transmit the optimum cell information only to the UE 500 that is authenticated by the management device 100 that is under the control of the MVNO, the company X, among the UEs 500.

Configuration of UE

Figure 8:
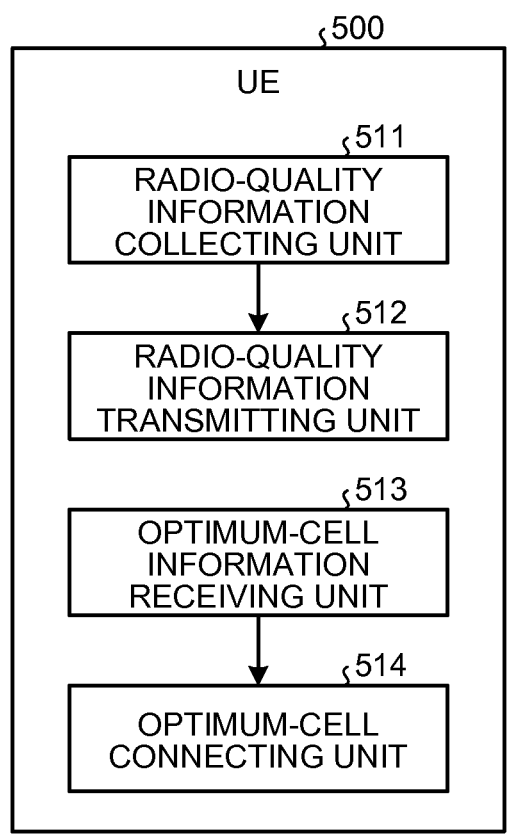
FIG. 8 is a block diagram that illustrates the configuration of a mobile device included in the communication system according to the present embodiment.

Next, an explanation is given of the detailed configuration of the UE 500 with reference to FIG. 8. FIG. 8 is a block diagram that illustrates the configuration of the UE 500 included in the communication system 10 according to the present embodiment. As illustrated in FIG. 8, the UE 500 includes a radio-quality information collecting unit 511, a radio-quality information transmitting unit 512, an optimum-cell information receiving unit 513, and an optimum-cell connecting unit 514.

The radio-quality information collecting unit 511 collects radio quality information (see FIG. 3) on the current cell and the adjacent/overlapping cells of the UE 500. An explanation is given of a detailed example. In the example illustrated in FIG. 1, the UE 500 measures the radio field intensities, or the like, of the current cell and the adjacent/overlapping cells in response to an instruction from the BS management device 300 and periodically informs the BS management device 300 of the radio field intensities, or the like, as a measurement reporting reply. The UE 500 periodically acquires from the BS management device 300 regulation information on the current cell and the adjacent/overlapping cells, or the like, as annunciation information.

In such a case, the radio-quality information collecting unit 511 collects, from the measurement reporting replay, information such as "radio field intensity", "radio error rate", and "adjacent/overlapping cell", which is the radio quality information, and also collects, from the annunciation information, information on "regulation information", "priority information", "cell ID", "current position", and "MNO-ID". Furthermore, the radio-quality information collecting unit 511 collects information on the "radio rate" from the radio rate of data in the communication channel established between the UE 500 and the management device 100 via the BS 400a. The radio-quality information collecting unit 511 collects information on the "retransmission rate" from the retransmission rate of data in the communication channel established between the UE 500 and the management device 100 via the BS 400a. Moreover, the radio-quality information collecting unit 511 collects information on the "connection rate" from the success rate of communication performed between the UE 500 and the management device 100. The success rate is obtained by using the number of attempts to establish a communication channel between the UE 500 and the management device 100 via the BS 400a and by using the number of successes in the establishment of the communication channel.

The radio-quality information transmitting unit 512 transmits the radio quality information collected by the radio-quality information collecting unit 511 to the management device 100 via the communication channel. An explanation is given of a detailed example. If the UE 500 has captured the BS 400a (see FIG. 1), the BS management device 300, which is under the control of the company A, receives a connection request from the UE 500 and then establishes a communication channel between the UE 500 and the management device 100 via the BS 400a. The radio-quality information transmitting unit 512 then transmits the radio quality information to the management device 100 via the established communication channel.

It is possible that the radio-quality information transmitting unit 512 transmits radio quality information to the management device 100 when, for example, a communication channel is established between the UE 500 and the management device 100 or when the radio quality information collected by the radio-quality information collecting unit 511 is changed. The radio-quality information transmitting unit 512 may periodically transmit radio quality information to the management device 100 while the communication channel is established between the UE 500 and the management device 100. Furthermore, the radio-quality information transmitting unit 512 may transmit radio quality information to the management device 100 when it receives a transmission request from the management device 100.

The optimum-cell information receiving unit 513 receives the optimum cell information, which is transmitted by the optimum-cell information transmitting unit 113 of the management device 100, by using the communication channel and notifies the optimum-cell connecting unit 514 of the optimum cell information.

The optimum-cell connecting unit 514 connects or hands over to the optimum cell indicated by the optimum cell information (see FIG. 5). Specifically, the optimum-cell connecting unit 514 reads, as an optimum cell, from the optimum cell information the cell ID with the highest recommended level (for example, the cell ID "D" with the recommended level "No. 1") among the cell IDs (for example, the cell IDs "D", "B", and "C") of the adjacent/overlapping cells corresponding to the current cell (for example, the cell ID "A") of the UE 500. Then, the optimum-cell connecting unit 514 connects or hands over to the optimum cell corresponding to the read cell ID (the cell ID "D" in the above-described example) so as to perform communication with the management device 100 via the BS that forms the optimum cell.

If the connection or handover to the optimum cell fails for some reason, the optimum-cell connecting unit 514 reads, as an optimum cell, from the optimum cell information the cell ID with the second highest recommended level (for example, the cell ID "B" with the recommended level "No. 2"). The optimum-cell connecting unit 514 tries to connect or hand over to the optimum cell corresponding to the read cell ID (the cell ID "B" in the above-described example).

As described above, in the present embodiment, the management device 100, which is under the control of the MVNO (company X), collects radio quality information from the UE 500 by using the communication channel established between the management device 100 and the UE 500, selects the optimum cell by using the collected radio quality information, and notifies the UE 500 of the selected optimum cell. The UE 500 then connects or hands over to the optimum cell notified by the management device 100. Thus, the MVNO can collect from the UE the radio quality information that is kept private by the MNO, and it is possible to prevent the MVNO from incorrectly selecting an optimum cell. As a result, if the MVNO provides services by using the communication facilities that are under the control of the MNOs in combination, the MVNO can correctly select an optimum cell for communication with a mobile device.

Process Performed by Communication System

Figure 9:
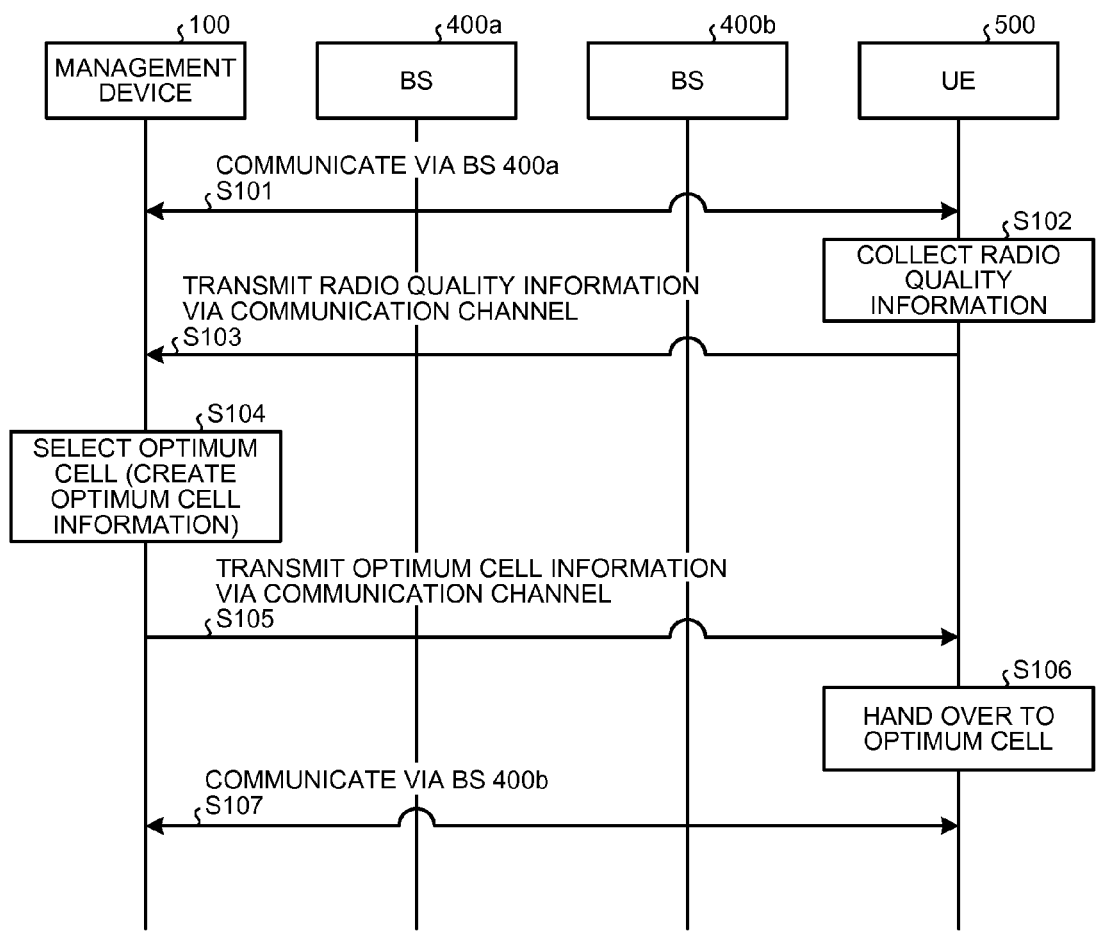
FIG. 9 is a sequence diagram that illustrates the flow of the process performed by the communication system according to the present embodiment.
Figure 10:
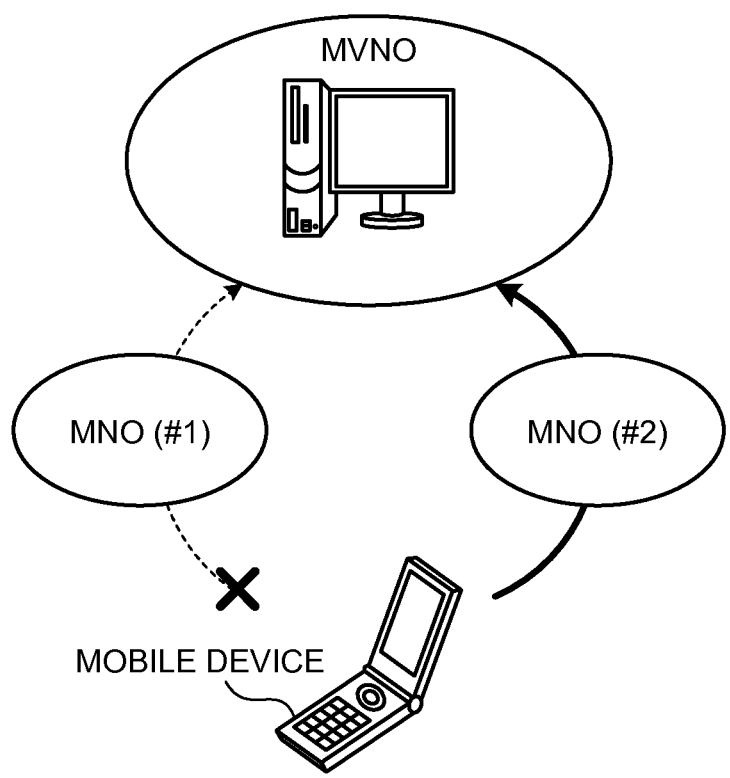
FIG. 10 is a diagram that illustrates a conventional technology.
Figure 11:
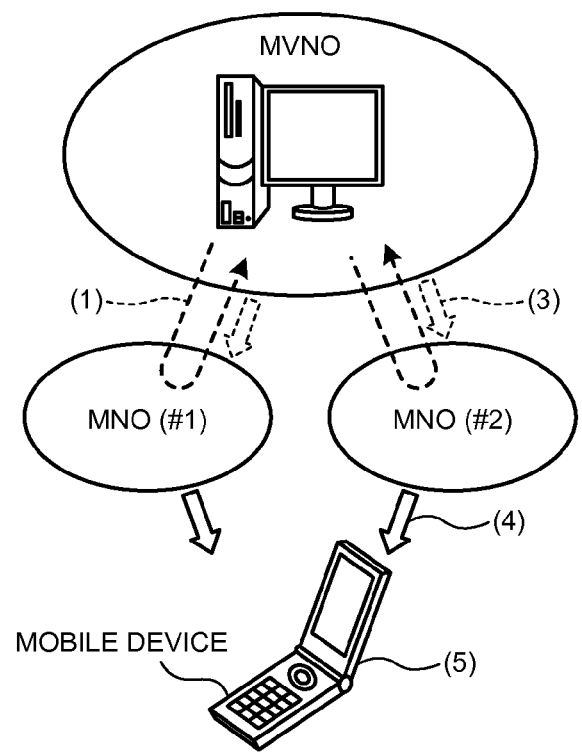
FIG. 11 is a diagram that illustrates a conventional technology.
Figure 12:
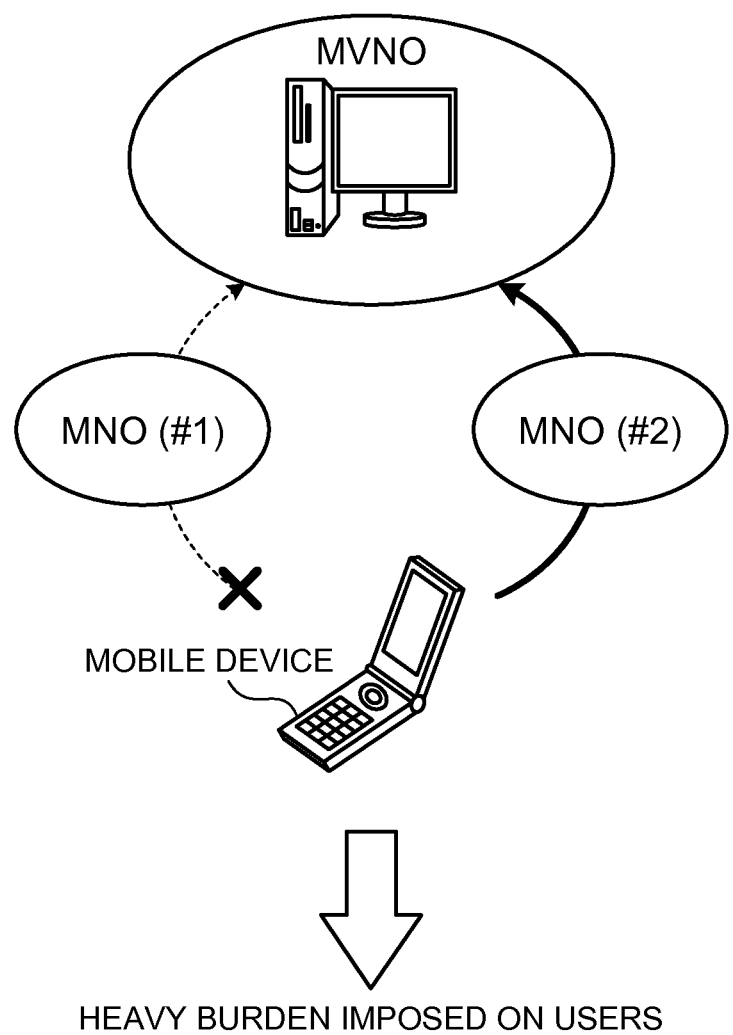
FIG. 12 is a diagram that illustrates a mobile-device-driven method.
Figure 13:
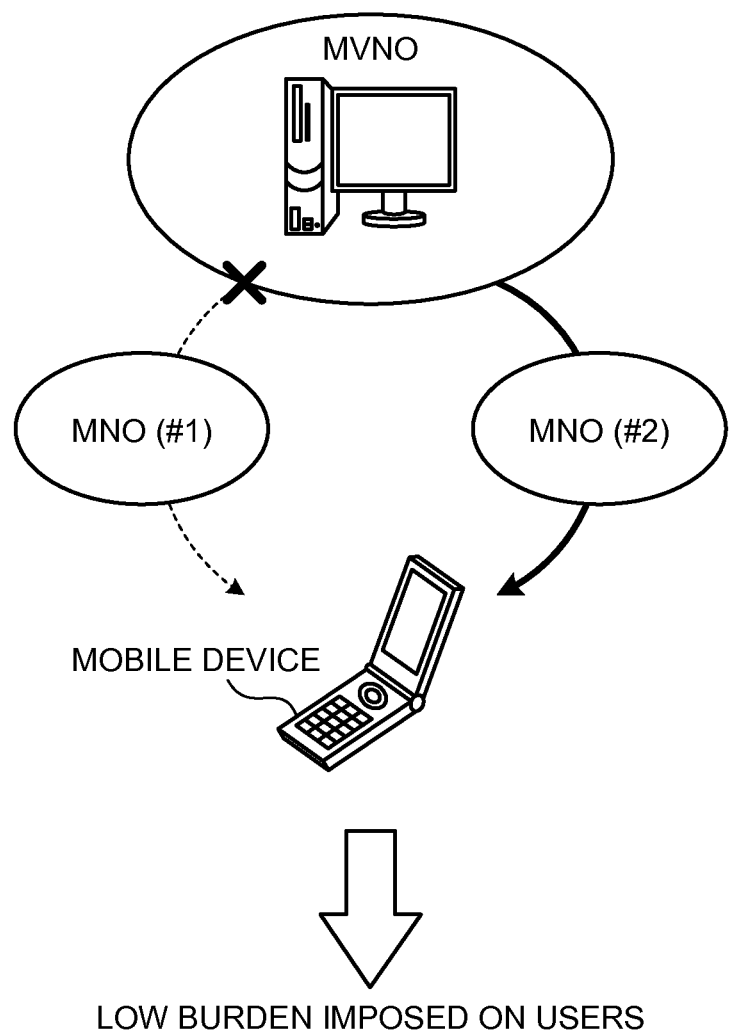
FIG. 13 is a diagram that illustrates an MVNO-driven method.

Next, an explanation is given, with reference to FIG. 9, of a process performed by the communication system 10 according to the present embodiment. FIG. 9 is a sequence diagram that illustrates the flow of the process performed by the communication system 10 according to the present embodiment. In FIG. 9, the cell formed by the BS 400a is the current cell of the UE 500, and the cell formed by a BS 400b among the adjacent/overlapping cells of the BS 400a is an optimum cell.

As illustrated in FIG. 9, after a communication channel is established between the UE 500 and the management device 100 via the BS 400a in response to a connection request sent from the UE 500, which has captured the BS 400a, to the BS management device 300, the management device 100 and the UE 500 perform communication with each other via the BS 400a (step S101).

The UE 500 then collects radio quality information on the current cell and the adjacent/overlapping cells of the UE 500 (Step S102). The UE 500 transmits the collected radio quality information to the management device 100 by using the communication channel (Step S103).

Afterwards, when receiving the radio quality information from the UE 500, the management device 100 selects an optimum cell with a desired radio quality from the adjacent/overlapping cells of the UE 500 by using the radio quality information (Step S104). Specifically, the management device 100 creates a cell management table by using the radio quality information and creates optimum cell information, which indicates an optimum cell, by using the created cell management table.

Then, the management device 100 transmits the created optimum cell information to the UE 500 via the communication channel (Step S105).

Afterwards, when receiving the optimum cell information from the management device 100, the UE 500 hands over to the optimum cell indicated by the optimum cell information (Step S106). Thus, a communication channel is established between the UE 500 and the management device 100 via the BS 400b that forms the optimum cell. Then, the management device 100 and the UE 500 perform communication with each other via the BS 400b that forms the optimum cell (Step S107).

In the present embodiment, the above-described process from Steps S102 to S105 is repeated on a regular basis so that the UE 500 receives the latest optimum cell information from the management device 100 and hands over to the optimum cell indicated by the latest optimum cell information at Step S106.

Advantages of the Present Embodiment

In the communication system 10, as described above, the management device 100, which is under the control of the MVNO, collects radio quality information from the UE 500 by using the communication channel established between the management device 100 and the UE 500, selects an optimum cell by using the collected radio quality information, and notifies the UE 500 of the selected optimum cell. The UE 500 connects or hands over to the optimum cell notified by the management device 100. Thus, the MVNO can collect from the UE the radio quality information that is kept private by the MNO, and it is possible to prevent the MVNO from incorrectly selecting an optimum cell. As a result, if the MVNO provides services by using the communication facilities that are under the control of the MNOs in combination, the MVNO can correctly select an optimum cell for communication with a mobile device.

According to the present embodiment, optimum cell information is transmitted to the plurality of UEs 500 by using an MBMS channel for transmitting and receiving MBMS data as a communication channel. As a result, the optimum cell information can be transmitted exclusively to a UE that is authenticated by the MVNO among a plurality of UEs.

Furthermore, according to the present embodiment, a cell management table is created in which information about the state of a cell, which can be calculated by using radio quality information, is related to each cell, and an optimum cell is selected by using the cell management table. Therefore, an optimum cell can be selected after the information about the states of the cells is comprehensively evaluated, and, as a result, the communication between the UE and the MVNO can be kept in a more desirable state.

If the MVNO provides services by using in combination the communication facilities that are under the control of a plurality of MNOs, the MVNO can correctly select an optimum cell for communication with a mobile device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication method performed by a communication system that includes a management device which is under control of a Mobile Virtual Network Operator (MVNO) and which performs communication with a plurality of base stations being under control of a plurality of Mobile Network Operators (MNOs) and a mobile device that can perform communication with the management device via a predetermined communication channel that is established between the mobile device and the management device via a base station among the plurality of base stations, the communication method comprising:

collecting, performed by the mobile device, radio quality information that indicates radio qualities of a cell that is currently being used for communication by the mobile device and of adjacent or overlapping cells of the cell and that is kept private to the MVNO by the plurality of MNOs, from each of the plurality of the base stations;

first transmitting, performed by the mobile device, the collected radio quality information to the management device by using the communication channel;

receiving, performed by the management device, the radio quality information from the mobile device by using the communication channel;

selecting, performed by the management device, a plurality of sets of an optimum cell with a desired radio quality among the adjacent or overlapping cells and an MNO, among the plurality of the MNOs, which has the base station corresponding to the optimum cell under control, by using the received radio quality information;

second transmitting, performed by the management device, optimum cell information that indicates the selected plurality of sets of the optimum cell and the MNO to the mobile device by using the communication channel;

connecting or handing over, performed by the mobile device, to the optimum cell in the selected plurality of sets indicated by the transmitted optimum cell information, and reestablishing, performed by the mobile device, the communication channel between the mobile device and the management device via the base station which is under control of the MNO in the selected plurality of sets indicated by the transmitted optimum cell information.

2. The communication method according to claim 1, wherein the second transmitting includes transmitting the optimum cell information to a plurality of mobile devices by using as the communication channel a Multimedia Broadcast and Multicast Service (MBMS) channel for transmitting and receiving MBMS data.

3. The communication method according to claim 1, wherein the selecting includes creating a cell management table where information about the states of cells that can be calculated by using the radio quality information is related to each of the cells and the selecting includes selecting the optimum cell by using the cell management table.

4. A management device that is under control of a Mobile Virtual Network Operator (MVNO) and that performs communication with a plurality of base stations being under control of a plurality of Mobile Network Operators (MNOs) and that performs communication with a mobile device via a predetermined communication channel that is established between the mobile device and the management device via a base station among the plurality of base stations, the management device comprising:

a memory; and a processor coupled to the memory, wherein the processor executes a process comprising:

receiving, from the mobile device by using the communication channel, radio quality information that indicates radio qualities of a cell that is currently being used for communication by the mobile device and of adjacent or overlapping cells of the cell and that is kept private to the MVNO by the plurality of MNOs, and that is collected, by the mobile device, from each of the plurality of the base stations;

selecting a plurality of sets of an optimum cell with a desired radio quality among the adjacent or overlapping cells and an MNO, among the plurality of the MNOs, which has the base station corresponding to the optimum cell under control, by using the radio quality information received at the receiving; and transmitting optimum cell information that indicates the plurality of sets of the optimum cell and the MNO selected at the selecting to the mobile device by using the communication channel so that the mobile device receives the transmitted optimum cell information, connects or hands over to the optimum cell in the selected plurality of sets indicated by the transmitted optimum cell information, and reestablishes the communication channel between the mobile device and the management device via the base station which is under control of the MNO in the selected plurality of sets indicated by the transmitted optimum cell information.

5. A mobile device that can perform communication with a management device that is under control of a Mobile Virtual Network Operator (MVNO) and that performs communication with a plurality of base stations being under control of a plurality of Mobile Network Operators (MNOs) via a predetermined communication channel that is established between the mobile device and the management device via a base station among the plurality of base stations, the mobile device comprising:

a memory; and a processor coupled to the memory, wherein the processor executes a process comprising:

collecting radio quality information that indicates radio qualities of a cell that is currently being used for communication by the mobile device and of adjacent or overlapping cells of the cell and that is kept private to the MVNO by the plurality of MNOs, from each of the plurality of the base stations;

transmitting the radio quality information collected at the collecting to the management device by using the communication channel;

receiving, from the management device by using the communication channel, optimum cell information that indicates a plurality of sets of an optimum cell with a desired radio quality among the adjacent or overlapping cells and an MNO, among the plurality of the MNOs, which has the base station corresponding to the optimum cell under control, the plurality of sets being selected by the management device by using the radio quality information transmitted at the transmitting;

connecting or handing over to the optimum cell in the selected plurality of sets indicated by the optimum cell information received by at the receiving; and reestablishing the communication channel between the mobile device and the management device via the base station which is under control of the MNO in the selected plurality of sets indicated by the optimum cell information received at the receiving.

\* \* \* \* \*